No. 878,859. PATENTED FEB. 11, 1908.
N. S. BÖK.
ELASTICALLY ARTICULATED SHAFT AND JOURNALING DEVICE.
APPLICATION FILED JULY 11, 1907.
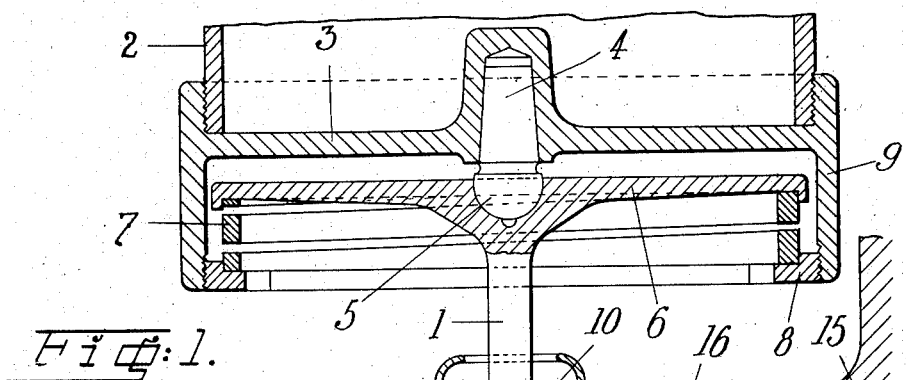
*Fig. 1.*
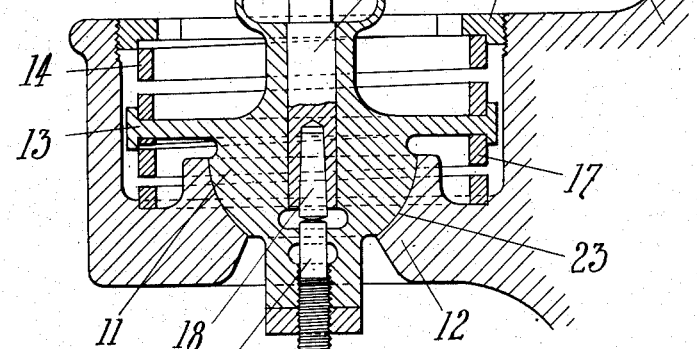
*Fig. 2.*
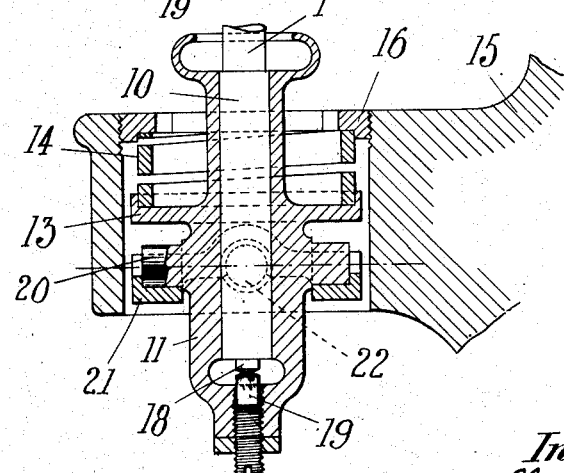
Witnesses.
Phil E. Barnes
J. J. Sheehy Jr.
Inventor
N. S. Bök.
By James J. Sheehy
Atty.

UNITED STATES PATENT OFFICE.

NILS SVENSSON BÖK, OF STOCKHOLM, SWEDEN.

ELASTICALLY-ARTICULATED SHAFT AND JOURNALING DEVICE.

No. 878,859.     Specification of Letters Patent.     Patented Feb. 11, 1908.

Application filed July 11, 1907. Serial No. 383,286.

*To all whom it may concern:*

Be it known that I, NILS SVENSSON BÖK, a subject of the King of Sweden, and resident of Stockholm, Sweden, have invented new and useful Improvements in Elastically-Articulated Shafts and Journaling Devices, of which the following is a specification.

This invention relates to improvements in elastically articulated shaft- and journaling-devices for fast rotating bodies, in which the bearing and the shaft have each a fixed rocking center.

The object of the invention is to obtain an easy and safe running of the fast rotating body.

The invention consists, chiefly, in the combination in an elastically-articulated shaft- and journaling-device of a rocking member or members, springs adapted to automatically counteract the rocking movements of said rocking member or members, and means for controlling the tension of said springs in such a manner that the pressure on the rocking surfaces may be determined by means of said springs independently of the weight of the rotating body, all as will be more particularly described herebelow with reference to the accompanying drawing forming a part of this specification.

The invention permits the use of short and thus comparatively strong and light bearings and shafts, the actions of the masses of which—in spite of the very rapid movements—are fully controlled by the variable power of the said springs, so that during the rotation the said masses will not have any disturbing influences with respect to the direction and size of the powers arising at the bearing surfaces and being necessary for the smooth and safe rotation.

The function of the springs of counteracting the rocking movements renders it possible—at suitably proportioned pressure on the rocking surfaces—to reduce to a minimum the work necessary for returning the rocking bodies into their central positions, and will thus render it easier to maintain the rotation.

The invention may be applied to vertical, inclined, or horizontal journaling devices independently of the length of the rotating body in the direction of the axis of rotation. In extended rotating bodies the present device is used at both ends thereof while in short bodies it may be used only at the one end of the same.

In the accompanying drawing I have shown two embodiments of my invention applied to a short rotating body supported by an upright shaft. Figures 1 and 2 show each a central vertical section of the device.

Like reference numerals indicate same or corresponding parts in both figures.

Referring to Fig. 1, 1 represents an elastically articulated shaft, supporting a tube-shaped rotating body 2, having a bottom 3 in the center of which is provided a conical pin 4 having a spherical head 5 the lower half of which rests in a corresponding central recess in a flange 6 at the upper end of the said shaft 1.

The bottom 3 is provided with a screw-threaded cylindrical flange 9 in which is inserted a ring-nut 8. Between the latter and the flange 6 is provided a spring 7 the tension of which is controlled by means of the said nut 8.

The pin 10 of the shaft 1 is journaled in an elastically articulated bearing-body 11 having a spherical part which is supported by the correspondingly shaped part 12 of the frame 15. A flange 13 of the said bearing-body is loaded by a spring 14 the pressure of which is controlled by means of a ring-nut 16 inserted in the frame 15.

A spring 17 rests on the frame and supports the said flange 13 in such a manner that only a suitable part of the weight of rotating system is transferred through the shaft 1 and pins 18 and 19 as pressure to the spherical surface 23 of the bearing-body 11. By said means the total pressure on the said spherical surface 23 is fully controllable by means of the loading spring 14. If desired controlling means may be provided also for the spring 17, though I have not deemed it necessary to show such means.

A similar device may be used for determining the part of the weight of the rotating body that should suitably rest on the spherical pin 5.

For the spiral-springs 7, 14 and 17 springs of other shape, such as circular spring-plates, may be substituted, and, if desired, also the flanges 6 and 13 may be formed as springs connected to the shaft- and bearing-bodies respectively.

Fig. 2 illustrates the application of my invention to a journaling device in which the rocking surfaces are cylindrical and in which the cylindrical supporting axles cross each other in the rocking center of the bearing.

The bearing body 11 is suspended by means of the cylindrical pins 20 in alinement with each other, the said pins being journaled in corresponding recesses of a ring 21. At right angles to said pins 20 the ring 21 is provided with recesses by means of which it rests on pins 22 likewise in alinement with each other; (only one pin 22 being shown by dotted lines in the drawing.) The said pins 22 are secured to the part of the frame 15 surrounding the bearing.

As will be easily understood the journaling device shown in Fig. 2 works in the same manner as that shown in Fig. 1.

Instead of one or more springs located concentrically with the axis of rotation a greater or smaller number of eccentrically located springs may be provided.

Instead of the cylindrical pins 20 and 22 and the corresponding recesses of the ring 21 shown in Fig. 2 conical pins or edges and corresponding pans may be used. The said edges are placed in or near to a plane through the rocking center of the bearing and the shaft respectively. For the said edges and pans may suitably be substituted thin elastic lamellæ secured to blocks used instead of the blocks provided with edges and pans.

Having now described my invention what I claim as new and desire to secure by Letters Patent is:

1. In an elastically articulated shaft and journaling device for fast rotating bodies, the combination of a bearing body having a fixed rocking center, a shaft in said bearing body, springs arranged to counteract the rocking movements of the bearing body, a rotating body, a pin rigidly secured to said rotating body and having a fixed rocking center in said shaft, and a spring arranged to counteract the rocking movements of the rotating body.

2. In an elastically articulated shaft- and journaling-device for fast rotating bodies the combination, of a bearing-body having a fixed rocking center, a shaft in said bearing-body, springs adapted to counteract the rocking movements of said bearing-body, a rotating body, a pin rigidly secured to said rotating body and having a fixed rocking center in said shaft, a spring adapted to counteract the rocking movements of said rotating body, and means for controlling the tension of said springs, substantially as and for the purpose set forth.

3. In an elastically articulated shaft and journaling device for fast rotating bodies, the combination of a frame, a member mounted to rock in said frame, coiled springs surrounding the rocking member and arranged to counteract the rocking movements thereof; one of said springs being also arranged to support a part of the pressure on the rocking surfaces, and a ring surrounding the rocking member and adjustable in the frame and affording a bearing for one of the springs.

4. In an elastically articulated shaft and journaling device for fast rotating bodies, the combination of a frame, a member mounted to rock in said frame and having a flange, a coiled spring surrounding the rocking member and interposed between the frame and one side of the said flange, a tension regulating ring surrounding the rocking member, and a coiled spring surrounding the rocking member and interposed between the said ring and the opposite side of the said flange.

In testimony that I claim the foregoing as my invention, I have signed my name in presence of two subscribing witnesses.

NILS SVENSSON BÖK.

Witnesses:
    EDW. DELMAR,
    JOHN DELMAR.